Aug. 18, 1964   H. HECHT   3,145,330
SERVOMECHANISM APPARATUS
Filed Nov. 16, 1962

INVENTOR.
HERBERT HECHT
BY
ATTORNEY

United States Patent Office 3,145,330
Patented Aug. 18, 1964

3,145,330
SERVOMECHANISM APPARATUS
Herbert Hecht, Los Angeles, Calif., assignor to Sperry Rand Corporation, Great Neck, N.Y., a corporation of Delaware
Filed Nov. 16, 1962, Ser. No. 238,213
4 Claims. (Cl. 318—19)

This invention relates in general to servomechanism devices and in particular to improvements in servomechanisms having redundant channels.

In the following description, the prior art apparatus upon which improvements have been made is described first. Then the inherent problem associated with the use of such apparatus is discussed. And, finally, the present invention and one of its embodiments is described, such embodiment being described as interconnected with the described prior art apparatus to emphasize how the invention eliminates the aforementioned problem. Suffice it to say here, however, that the invention operates to prevent nuisance disengagement of a whole redundant type servo system when its respective channels are all operative.

A principal object of the invention is to provide an improvement in servomechanism systems.

Another object of the invention is to provide apparatus that prevents unwarranted disabling of all channels in a servo system that comprises a redundant arrangement of independent cooperating servo channels.

The invention will be described with reference to the figures wherein.

Prior Art

Figure 1:
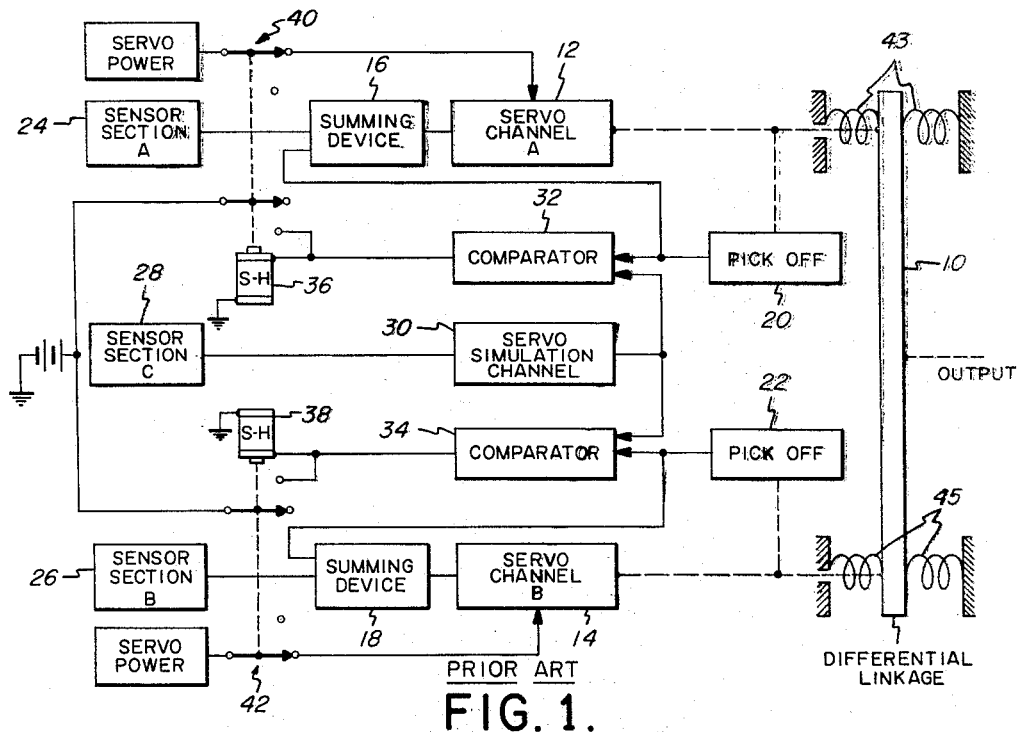
FIG. 1 is a block diagram of apparatus employed in the prior art.

Referring to FIG. 1, two redundant servo channels are connected to a differential bar linkage 10, the central portion of which is adapted to be linked to an output member so that such member will be driven when the linkage is driven. The upper section of the linkage 10 is adapted to be translationally driven by the output of a first servo channel 12 and the lower section of the linkage is adapted to be likewise driven by the output of a second servo channel 14. By so connecting the servo channels to the differential linkage 10, movement of the output member is assured even though one servo channel should fail. (However, under such circumstance, the output member moves only half as fast for a given input as it would move if both channels were operative.) The servo channels 12 and 14 each receive input signals from respective summing devices 16 and 18, which in turn respectively algebraically add channel feedback signals (from pick-offs 20 and 22) to output signals from sensors 24 and 26.

In the event one servo channel fails, it is desirable to restore the linkage 10 end connected to such channel to a neutral position, this being so that the operative servo channel will be free to travel fully in either direction in response respectively to signals of opposite senses. For example, if the channel 12 should fail with the linkage 10 in an extreme position, movement of the linkage end connected to the operative channel could only be toward the other extreme position, i.e. the bar linkage 10 in pivoting about the point where its upper end was when the servo 12 failed would have very limited travel. In determining which of two servo channels fails to operate properly, various component arrangements are possible. For example: in FIG. 1 a third signal producing sensor 28 applies its output signal to a servo simulation channel 30, such channel operating to produce a signal substantially identical to the output signals produced by the servo channels 12 and 14 by means of their respective pick-offs 20 and 22 (i.e. when both channels 12 and 14 operate properly). See Electronic Analogue Computers, Korn and Korn, McGraw Hill Book Company, Inc., New York, 1956, pages 96–97, FIG. 3.10, or network 51 of U.S. Patent 2,823,877, filed in the name of J. J. Hess, Jr., and assigned to the instant assignee, for examples of servo simulator apparatus which may be employed by the hereindescribed prior art apparatus. The output signal from the servo simulation channel 30 is applied simultaneously to comparators 32 and 34, e.g. the circuit shown and described in Massachusetts Institute of Technology, Radiation Laboratory Series, vol. 19, FIGS. 9–20, McGraw Hill Book Co., 1949, each of which receives respectively a signal from the pick-offs 20 and 22. Should there be a discrepancy between the two signals applied to a comparator, such comparator produces an output signal. Connected to receive the output signals, if any, from the comparators 32 and 34 are self-holding relays 36 and 38 which, on being energized, respectively open normally closed switches 40 and 42. When open, the switches 40 and 42 interrupt power being applied respectively therethrough to the servo channels 12 and 14. Then, with power removed from a channel, the end of the linkage to which that channel is connected is allowed to ride free, the result being that centering springs 43 and 45 return such free riding end to a neutral position.

Problem

As a general rule, the apparatus of FIG. 1 provides good, fail-safe operation, with a failing channel being disabled and neutralized while permitting an operative channel to take over and control the output. However, it has been found that, though there is no failure of either, both channels oftentimes disable, with the result being that should the apparatus of FIG. 1 be employed in an autopilot for control of an aircraft, e.g. a VTOL craft during a critical flight mode, extremely dangerous situations might occur. Cause of both channels disengaging is, to a great extent, considered to be the result of improper matching of the characteristics of the simulation channel 30 to the characteristics of the working channels 12 and 14. Hence, when certain type signals, e.g. noise, transients, harmonics, are applied to all three channels 12, 14, 30, they follow (to provide respective output signals) their input signals differently. For example, a high frequency signal will probably appear at the output of the simulation channel 30 before either servo channel can even start to drive its respective signal producing pick-off 20 or 22. With both comparators 32 and 34 receiving a simulation channel 30 output signal (and little or no respective servo channel signals) the relays 36 and 38 energize, thereby causing the power applied to both servo channels 12 and 14 to be cut. Power can then be re-applied by opening the self-holding contacts of the relays 36 and 38.

Figure 2:
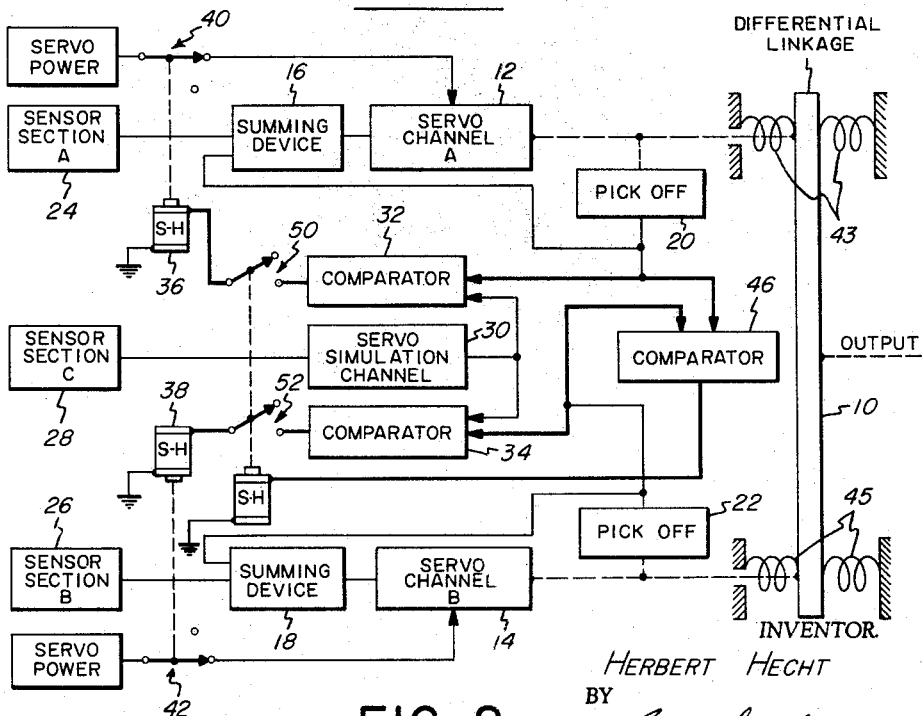
FIG. 2 is a block diagram showing the apparatus of FIG. 1 as improved by the invention.

To prevent such nuisance disengagements of the servo channels, as outlined above, the apparatus of FIG. 1 is modified to include the apparatus indicated by bold lines in FIG. 2.

The Invention

Referring to FIG. 2, a comparator 46, e.g. a subtraction circuit, receives the output signals from the pick-offs 20 and 22 and produces an output signal proportional to the difference between its applied input signals. The comparator 46 output signal is applied to a self-holding relay 48 (the self-holding contacts of which are not shown for reasons of clarity) which operates to close normally-open switches 50 and 52 when the relay receives a signal greater than its pull-in signal. The switches 50 and 52 are so connected, i.e. in series with the respective outputs of the comparators 32 and 34, that the relay 48 must actuate before either the relay 36 or the relay 38 may actuate.

Under normal operation: in the event one servo channel fails, e.g. channel 12, the output signals from the pick-off 20 and 22 will eventually differ and, when this occurs, the comparator 46 will apply a signal to the relay 48 to cause it to close the switches 50 and 52. At this time, with the servo simulation channel 30 output signal being compared with the servo channel 14 output signal by the comparator 34, no signal is applied through the switch 52 to the relay 38 because the simulation channel 30 and servo channel 14 track each other. However, since the servo channel 12 has failed, the comparator 32 produces an output signal which actuates the relay 36 and removes power from the servo channel 12, thereby causing the bar linkage 10 upper end to be restored to a neutral position by means of the centering springs 43.

With the sensors 24, 26 and 28 applying transient signals (or any other of the above-mentioned "certain" signals) to the channels 12, 14 and 30 respectively, neither the channel 12 nor the channel 14 disables unless there is a failure of either. This is because the comparator 46 can produce no output signal so long as its input signals are equal, i.e. so long as each servo responds in the same manner. Therefore, even though the servo channel 12 pick-off 20 produces a signal different from the signal produced by the simulation channel 30, and even though the servo channel 14 pick-off 22 produces a signal different from the simulation channel 30, both servo channels remain operative. In other words, though the comparators 32 and 34 produce "channel disabling signals" the entire system must remain operative unless there is a definite failure in only one channel.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a servo system having a pair of signal responsive channels each of which has an output part so connected to move simultaneously an output member for the system that should one channel become inoperative the other can still move said member, said channels being each respectively provided with malfunction detection means for deactivating them and restoring their respective output parts to neutral positions when malfunctions occur, apparatus for assuring against unwarranted deactivating of said channels comprising means connected to receive signals representative of the amount said output parts move, said means producing an output signal when one part moves a predetermined amount more than the other, and means responsive to said output signal to enable both said malfunction detection means, whereby said means connected to receive signals operates to monitor the operation of said servo system and assures that a system malfunction must be detected before one of said servo malfunction detection means can operate to deactivate a failed channel.

2. A servo system comprising first and second signal responsive servo means, first and second output parts respectively connected to be moved from respective neutral positions by said servo means, first and second means for determining when respective servo means malfunction to disable the malfunctioning servo means and restore its output part to its neutral position, means connected to receive signals representative of the amount said output parts move, said last-mentioned means producing an output signal when one part moves a predetermined amount more than the other, and means responsive to said output signal to enable both said malfunction determining means, whereby said means connected to receive signals operates to monitor the operation of said servo system and assures that a system malfunction must be detected before one of said servo malfunction determining means can operate to disable a failed channel.

3. In a servo system having a pair of signal responsive servo channels which each have output parts differentially connected to drive an output member for the system, whereby should one servo channel become inoperative the other channel can still move the system output member, said system being also provided with means for computing a signal representative of what the instantaneous output of each servo should be and means for disabling said servo channels when signals representing their respective instantaneous outputs are different from the computed signal by more than a predetermined amount, means for producing a signal representing the difference between the outputs of both said signal responsive servo channels, and means responsive when said difference signal exceeds a certain amount to enable said means for disabling said signal responsive servo channels, whereby the two channels must first be detected as operating differently before the means for disabling said channels can operate to disable one.

4. A servo system comprising first and second signal responsive servo channels, differential means driven by both said channels and having an output member which is the output member for the system, whereby one servo channel can drive the output member should the other become inoperative, means for computing a signal representative of what the instantaneous output of each servo should be, means for producing a signal representative of the difference between the outputs of both said signal responsive servo channels, respective means for each channel responsive when said difference signal exceeds a certain amount to compare signals representing the respective servo channel outputs with the computed signal, thereby producing respective comparison signals, and means for each channel responsive to disable such channels when their respective comparison signals exceed predetermined amounts.

No references cited.